(12) United States Patent
Stephan

(10) Patent No.: US 7,043,575 B2
(45) Date of Patent: May 9, 2006

(54) BUS FUNCTION AUTHENTICATION METHOD, APPARATUS AND COMPUTER PROGRAM

(75) Inventor: Yann Stephan, Echirolles (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 152 days.

(21) Appl. No.: 10/114,319

(22) Filed: Apr. 3, 2002

(65) Prior Publication Data
US 2002/0143921 A1 Oct. 3, 2002

(30) Foreign Application Priority Data
Apr. 3, 2001 (EP) ................................ 01410037

(51) Int. Cl.
*G06F 3/00* (2006.01)
(52) U.S. Cl. .............................. 710/36; 710/8; 710/10
(58) Field of Classification Search ................. 710/36, 710/8–10
See application file for complete search history.

(56) References Cited

U.S. PATENT DOCUMENTS

| 5,552,776 | A | * | 9/1996 | Wade et al. ................ 340/5.74 |
| 5,692,219 | A | * | 11/1997 | Chan et al. .................... 710/49 |
| 5,768,619 | A | * | 6/1998 | Roberts ........................ 710/10 |
| 5,822,614 | A | * | 10/1998 | Kenton et al. ................. 710/8 |
| 5,960,172 | A | * | 9/1999 | Hwang ........................ 713/200 |
| 6,003,135 | A | * | 12/1999 | Bialick et al. ............... 713/201 |
| 6,012,103 | A | * | 1/2000 | Sartore et al. ................. 701/8 |
| 6,493,796 | B1 | * | 12/2002 | Arnon et al. ................ 711/114 |

FOREIGN PATENT DOCUMENTS

| EP | 930556 A2 | * | 7/1999 |
| GB | 2 344 197 A | | 5/2000 |
| WO | WO 00/51031 A1 | | 8/2000 |
| WO | WO 00/77967 A2 | | 12/2000 |

OTHER PUBLICATIONS

Universal Serial Bus Specification Revision 2.0, Section 9.4, pp. 250-260.*

* cited by examiner

*Primary Examiner*—Kim Huynh
*Assistant Examiner*—Eron Sorrell

(57) ABSTRACT

Devices connected to a communications bus are selectively accessed to the bus that communicates between one or more devices and a host machine. On the basis of analyzed device characteristics, communication between the device and the host machine via the bus is enabled or disabled. Filtering software intercepts the results of a GET_DESCRIPTOR function and compares same with the contents of a disallowed device characteristic list. If the device is disallowed, data flow is remapped to a generic driver which halts configuration or communication on the bus. Alternatively, configuration/communication on the bus is halted for that device.

20 Claims, 3 Drawing Sheets

BUS FUNCTION AUTHENTICATION METHOD, APPARATUS AND COMPUTER PROGRAM

TECHNICAL FIELD

The present invention relates to methods, apparatus and computer programs for controlling devices connected to a data bus port and more particularly to such a method, apparatus and program wherein communication between a device and a host machine via a bus is enabled or disabled on the basis of a comparison between analyzed characteristics of the device and data relating to specific devices.

BACKGROUND ART

The Universal Serial Bus (USB) is a standard interface for connecting peripherals to personal computers. The USB eliminates the need to install controller cards into dedicated slots on the computer motherboard as well as avoiding the need to configure a port to allow communication with a specific peripheral device. The USB approach provides 'plug and play' functionality which allows a wide variety of devices such as mice, printers, video capture hardware, modems, etc. to be connected to a personal computer with little or no configuration.

All USB devices are connected to a corresponding host computer through a specific connector type using a tiered-star topology. The host computer includes a single USB host controller which provides the interface between the USB network and the host personal computer and controls all access to USB resources and monitors the bus's topology. The network can be extended by means of one or more USB hubs which provides further attachment points for additional USB devices.

As there is no need to a user to configure the host computer or install interface cards, any USB device may be connected to a computer simply by plugging the device into an available USB port. There is generally also no need to power down the computer as 'hot-plugging' is an explicit and highly advantageous feature of the USB architecture.

Given that most personal computers are now shipped with one or more USB ports, the ease of attaching USB peripherals raises the issue of security and control of USB host computers in certain situations. Such situations include computers located in public access environments such as universities and libraries. It is of course possible to physically disconnect the USB ports from the host controller. However, this may require the computer to be partially dismantled and may raise issues of warranty invalidation and accidental damage to the computer hardware. It may also be possible to physically prevent USB devices from being plugged into the machine by shielding or masking the USB ports themselves. However, neither of these solutions is desirable as they are inflexible, can be physically tampered with, require at least a minimum of technical knowledge and may not be reversible.

At a more technical level, it is relatively straightforward for a system administrator to enable or disable a USB port in software. However, it is presently not possible to select or limit the specific devices or class of devices that can be plugged into a USB host computer, hub or other point on a USB network. This capability would be highly desirable in, for example, a corporate context where it may be necessary for a user of a hand-held or portable computing device to temporarily connect to a host computer to update mobile databases, upload meeting agendas etc, while perhaps preventing a card reader, input device or other unauthorised peripheral from being connected to the host computer. On the other hand, a system administrator may wish to restrict the class or devices available for connection to only output devices such as portable printers etc. Thus a substantial degree of flexibility is needed to satisfy these requirements, such flexibility being unavailable at the present time.

There therefore exists a need to be able to dynamically and flexibly configure device access and authorization to a USB network in a way which is reversible, configurable and preferably performed in software. Ideally, this configuration may optionally be achieved by means of a network or direct connection with the USB host computer.

It is the object of the present invention to provide a solution to the abovementioned task, or to at least ameliorate the problems outlined above, which is capable of being effected in hardware or software and is effective, flexible and inexpensive to implement and administer.

DISCLOSURE OF THE INVENTION

In one aspect the invention provides for a method of selectively allowing devices access to a communications bus, said bus adapted to allow communication between one or more devices and a host machine, the method including the steps of:
 (a) connecting a device to the communications bus;
 (b) analyzing the device's characteristics;
 (c) comparing the device's characteristics with data relating to specified devices;
 (d) on the basis of the device's characteristics, enabling or disabling communication between the device and the host machine via the bus Thus the devices can be vetted or authorized prior to communicating on the bus and disallowed devices prevented from being attached to the bus and thus communicating with the host machine.

In a preferred embodiment, the data relating to specific devices is stored on the host machine and may be in the form of a table of parameters corresponding to disallowed devices.

In a preferred embodiment, the analysis step is carried out as part of the configuration step of connecting a device to the bus.

The communication between the device and the host machine is preferably handled by a device driver corresponding to the specific device.

If the devices characteristics correspond to those stored in the table of parameters, the device is flagged as being disallowed.

In a preferred embodiment, where the device is disallowed, data flow from the device is preferably redirected to a generic device driver which prevents the disallowed device communicating on the bus.

Alternatively, if the device is disallowed, the host machine may transmit a signal which stops detection of the disallowed device.

If the device is allowed, data flow from the device is directed to a driver corresponding to the device whereupon communication is initiated on the bus.

Preferably, the communications bus conforms to the universal serial bus (USB) standard.

Preferably, the analysis step is carried out by filtering software which queries the device for device descriptors, compares the returned device descriptors with those listed in a table of disallowed device descriptors and, if the device is allowed, initiating data transfer on the USB or alternatively, if the device is disallowed, preventing communication on the USB.

If the device is disallowed, data transfer from the device is remapped to a generic device driver, the device driver being adapted to prevent the disallowed device communicating on the USB.

The remapping step may be effected by assigning one or more new device descriptors to the device which cause the device to be linked to the generic device driver.

Preferably, the filter software issues a GET_DESCRIPTOR function which causes the device to return one or more descriptors which relate to the characteristics of the device and can be used to identify whether the device is allowed or disallowed.

The characteristics of the device may include device type, manufacturer, class of device and the like.

BRIEF DESCRIPTION OF THE DRAWINGS

The present invention will now be described by way of example only and with reference to the drawings in which.

BEST MODE FOR CARRYING OUT THE INVENTION

Figure 1:
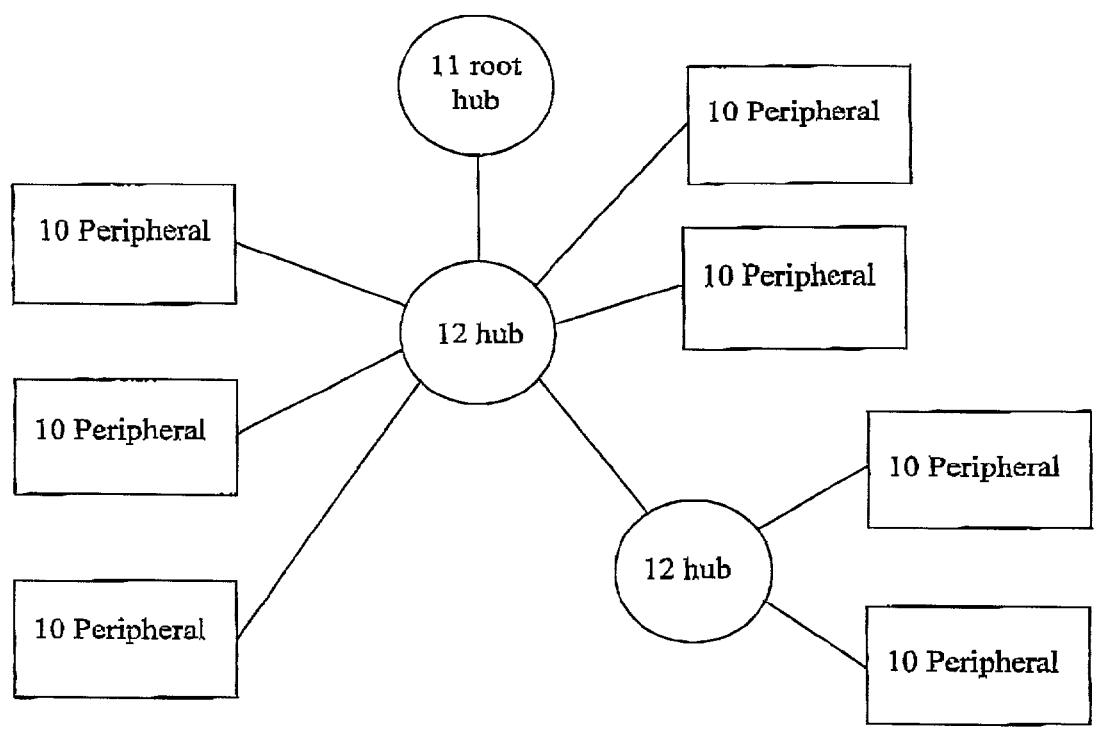
FIG. 1 illustrates a schematic of the tiered-star topology of a USB network.

Referring to FIG. 1 a simplified schematic of a USB network topology is shown. The USB topology corresponds to that of a tiered-star. At the center of each star is a hub 12. Each point on a star is a device that is connected to one of the hubs ports. As shown in FIG. 1, the devices 10 can be additional hubs 12 which then form the center of further star blocks. The root hub corresponds to the physical hardware corresponding to the USB host or computer.

According to the USB architecture, all devices on a bus share a single data path to the host computer. Logically, a device is a function or a piece of hardware that provides a single type of functionality to the host. Thus a single peripheral can embody more than one device, for example a mouse which includes a movement sensor combined with one or more keypress units. In this case the peripheral is referred to as a compound device. Each device has a unique port address on the bus and all ports on the bus share a single path to the host. The USB bus host (located in the host computer) monitors the USB network topology and takes care of scheduling and send/receive data processes in relation to peripherals on the bus.

There exist two types of USB communications, namely configuration and data transfer functions. The present invention is primarily related to the first of these types of communications, although with modification the invention may be applied to the latter.

All data transmissions on the USB travel to or from a device endpoint. An endpoint is a buffer that stores data and corresponds to a uniquely addressed part of a USB device. Each device has an endpoint configured as number 0 and corresponds to a control endpoint.

USB data travels via a "pipe". A pipe is a logical association between a devices endpoint and the host controller's software. Pipes are created dynamically after system power-up or device connections If a device is removed from the bus or data transmission is no longer needed, the host controller reconfigures the network architecture to remove the pipe from the USB topology.

As part of the configuration phase of device connection, the host receives configuration information which includes a configuration descriptor for each endpoint that the device has available as well as a device descriptor which defines the default communication pipe that is used to configure the device. More specifically, when a host machine initially establishes communications with a peripheral, each endpoint returns a descriptor. This is a data structure that tells the host about the endpoint's configuration and expectations. Descriptors include transfer type, maximum size of data packets, perhaps the interval for data transfers, and in some cases, the bandwidth needed for the USB device to operate. On the basis of this information, the host establishes connections to the endpoints through virtual pipes. This allows the host to communicate with the device by providing it with configuration information such as the maximum size of the data packets, endpoint addresses and transmission interval.

The USB architecture is designed to handle four different types of data transfer: control, bulk, interrupt and isochronous. Control data corresponds to configuration information about the peripheral. Bulk data may correspond to, for example, printer data sent in bulk to the device with relatively lax speed requirements but high accuracy. Interrupt data may be data originating from a mouse or a keyboard and is required to be interpreted by the host controller very quickly. Isochronous data transfer is used for data which must be communicated at a fixed clock rate, for example. Examples include audio, video or other data which requires a fixed frequency of data transmission in order to present a comprehensible data stream at the output.

When data communication (configuration or data transfer) is required between a peripheral and a host computer, a transfer is initiated. A transfer is defined as the process of making and carrying out a communication request In the present case when a control data transfer is requested by the host controller, the device driver in the host communicates with the device. This is usually implemented by a piece of application software which identifies a device using a handle retrieved using standard API calls. To initiate the control transfer, the application may use the handle in calling an API function to request configuration information from the devices driver.

According to one embodiment of the present invention, the method for authorizing a devices connection to the bus is as follows. When the device is plugged in or a notification received from the module which handles the power management functions in relation to the USB, the configuration software component transmits a Reset_Port command. This forces the device to enter a default state. At this point the device is unconfigured and responds only to requests targeted at endpoint and device zero. The configuration software retrieves the device class by determining which device class the particular device belongs to. In a preferred embodiment, this step uses the GET_DESCRIPTOR function. The GET_DESCRIPTOR function retrieves all necessary information from the peripheral. A request for configuration descriptor will cause the device to return the configuration descriptor, plus all interface descriptors for that configuration and all endpoint descriptors for the interfaces. This command is sent by the host control driver and the filter driver will intercept its results and, in a preferred embodiment, depending whether the device is allowed, will change its structure.

Figure 2:
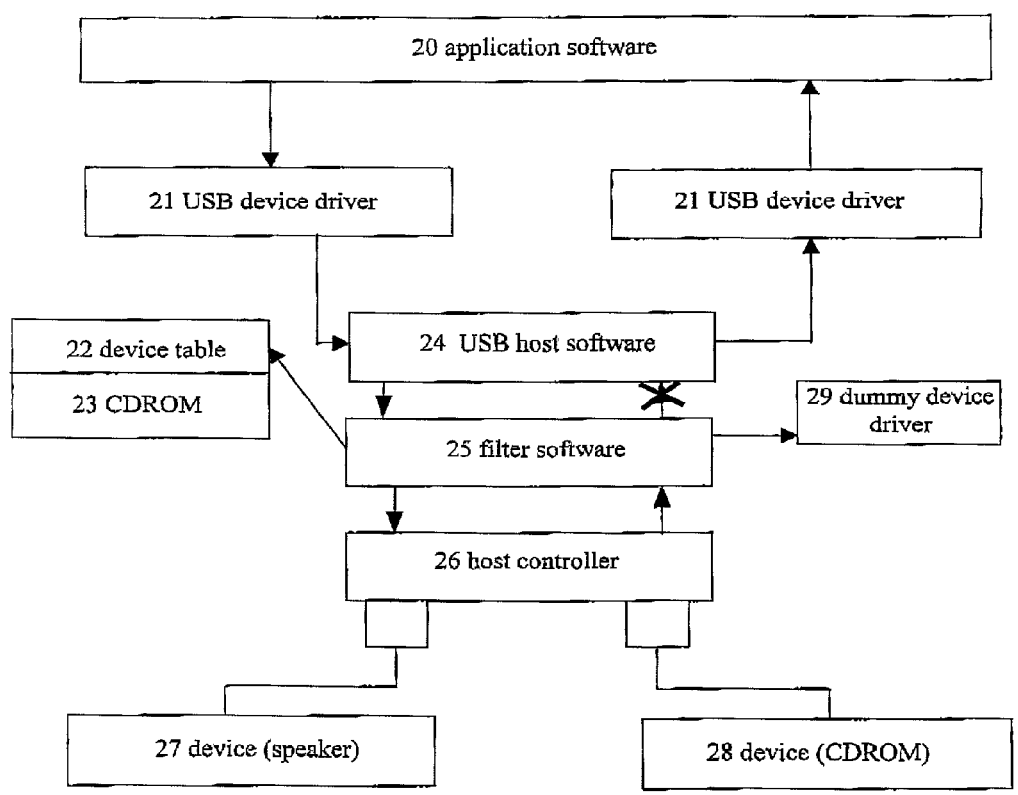
FIG. 2 illustrates a simplified schematic of an interface between a host controller and a USB device.

Reference is made to FIG. 2 which illustrates a simplified schematic of a USB interface. An exemplary two port USB network is shown whereby application software 20 communicates via USB device drivers 21. Configuration requests are transmitted via USB host software 24 to the host controller 26 via filter software 25. The function of the filter software will be discussed in more detail below. Two devices are shown residing on the USB: a speaker 27 and a CDROM 28. In the present example, the filter software is configured to prevent access by the CDROM to the USB. The filter software 25 includes a device table 22 which specifies which devices are allowed or how the configuration software should behave when a particular device is attached to the bus.

Because the filter driver is loaded before any requests to the bus, the filter driver is ready and will intercept the results of the first GET_DESCRIPTOR when the peripheral sends its request for initialization. When the GET_DESCRIPTOR command is transmitted, the filter software 25 will check the responses to the GET_DESCRIPTOR function against entries in the (disallowed) device table. The fields may include the device class, device subclass, vendor, device manufacturer etc. When these fields are accessed, the filter software 25 checks if the device is allowed to be plugged into the bus. The rules for configuration allowance or data transfer authorization may be in the form of a lookup table 22 or similar which lists the disallowed devices and their descriptor characteristics. If attachment of the peripheral to the USB is allowed, then the descriptor data flow will be unchanged and the data is directed to the appropriate device driver 21. Otherwise, in a preferred embodiment of the invention, this descriptor structure is patched in order to disable the disallowed device. This may be done by assigning new device and vendor identifications and will thus link the peripheral to a dummy device driver 29 that does nothing. That is, if the device is not allowed, the filter may, for example, change the device and vendor ID in order to connect the device to a generic driver 29 that causes the device to remain unconfigured. This embodiment of the invention may be preferable as it allows the host controller to retain control over the device while simultaneously preventing it communicating over the USB. The dummy driver technique may also be desirable as it may be necessary to retain control of, for example, power management functions or be able to change the access permission of a device while it is connected. It may also be desirable for the disallowed device to be treated as part of the USB network, while simultaneously preventing it from communicating on the bus.

Alternatively, the filter software may send a False End of Packet in order to stop the detection of the device. This latter action will cancel or prevent the loading of the device driver for that device and the peripheral is effectively prevented from being connected to or interact with the USB network.

Figure 3:
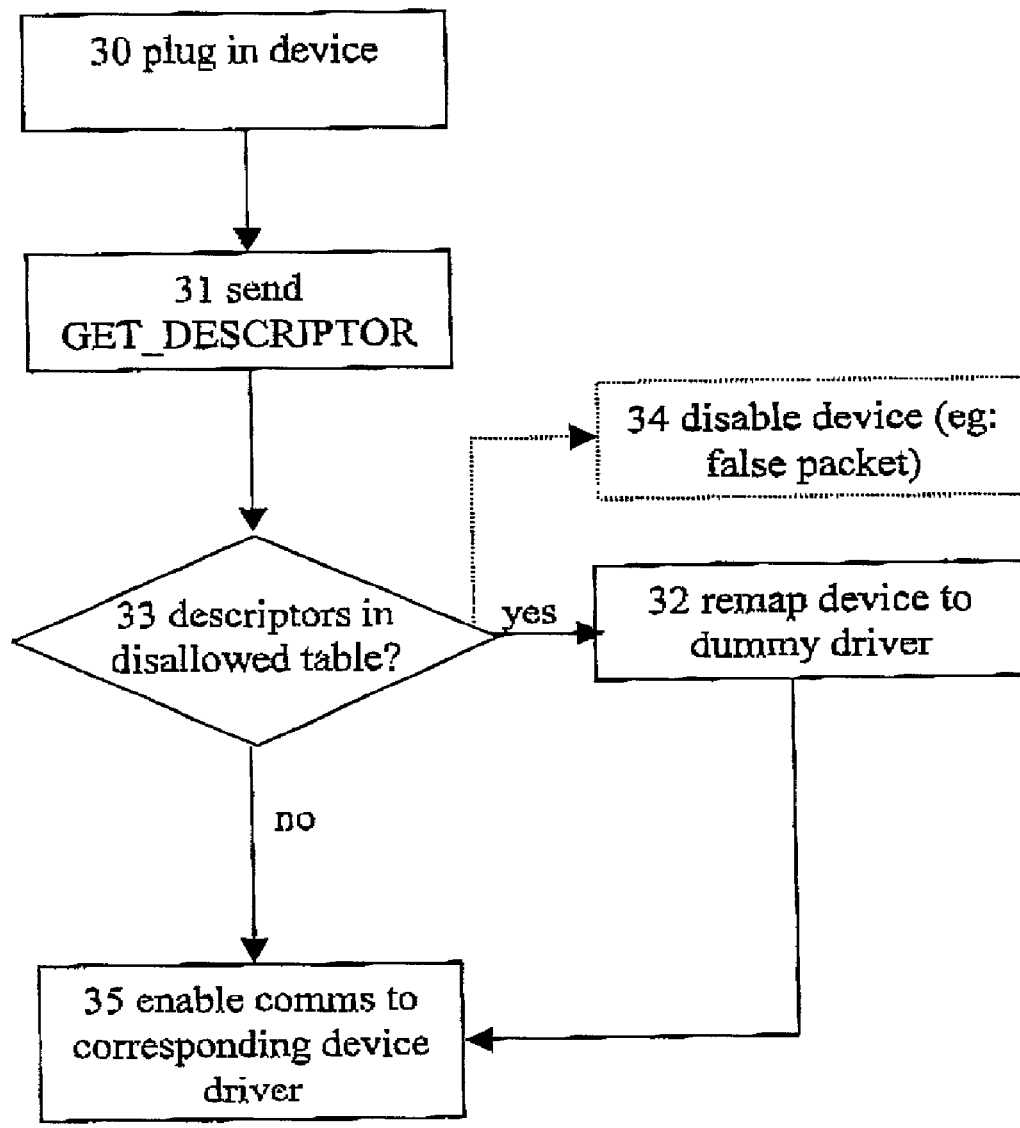
FIG. 3 illustrates a flowchart setting out an exemplary embodiment of the steps in authenticating a device's connection to a USB.

This process is shown schematically in the simplified flowchart of FIG. 3. At 30 a device is plugged in. The results of the GET_DESCRIPTOR function and descriptor analysis (31/33) are then used, in this embodiment, to determine whether the data flux is to be redirected by remapping the configuration device descriptors, to a dummy driver 32. Once data flow is enabled between the appropriate driver (including possibly the dummy driver) it can be seen that the disallowed device is prevented from communicating on the bus, but the system is aware of its presence and can therefore deal with any network functions or which may be necessary. An alternative technique is illustrated schematically by the dashed line in FIG. 3, where the disallowed device is disable by means of a false end of packet signal 34.

As shown in the example in FIG. 2, the effect of the filter is to stop data transfer between the USB host and the host controller for a GET_DESCRIPTOR response which identifies the device 28 as a CDROM. However, the filter allows transfers for the allowed device 27 (speaker) which is not listed in the device table 22. During the initialization phase, the CDROM device has been linked to the generic driver, and so any request to the CDROM device will be sent to the generic driver which does nothing thereby preventing the CDROM from accessing the USB.

Because the filter may be implemented in software, it can be reconfigured relatively easily and without interference with the hardware of the host computer. Further, the filter software does not conflict with the standard operation of the USB architecture as it is implemented in such a way that the plug and play functionality is not interfered with. To this end, the filter software intercepts communications between the host software and the host controller but does not interfere with the operation of either. In effect the filter software acts to remap communications between the USB layers so that a disallowed device will be prevented from communicating data on the bus. The invention thus complies with the USB standard to the extent that it intercepts and potentially remaps descriptors in the datastream without affecting the operation of the host controller or the host software. Thus the technique is non-invasive and is unlikely to cause unwanted or unpredictable behavior in the bus.

In a preferred embodiment, a special driver package will be given to end-user. The driver will be installed and manageable only by an administrator. The installation installs the filter driver by decking its presence to the Operating System with the rest of the installation being done by the Operating System. In general, the driver will be installed and loaded when needed.

Thus the invention provides for a method and apparatus for controlling which devices can be plugged, in a preferred embodiment, into a USB. The method is readily implemented and capable of administration over a network. With some modification, the invention may be applied to other suitable bus architectures such as ATM etc. However, the invention is envisaged to have particular utility in a plug-and-play architectures such as the USB.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claim is:

1. A method of selectively allowing a device connected to a communications bus access to the communications bus, said bus being adapted to allow communication between one or more devices having analyzed device characteristics and a host machine, the method including the steps of:
   (a) comparing the analyzed device characteristics with data relating to one or more specified devices;
   (b) enabling or disabling communication between the device and the host machine via the bus on the basis of the analyzed device characteristics; and (c) redirecting data flow from the device to a genetic device driver which prevents the disallowed device from communicating on the bus in response to the device being disallowed.

2. A method of selectively allowing a device connected to a communications bus as claimed in claim 1, wherein the data relating to one or more specific devices are stored in the form of a table of parameters corresponding to disallowed devices;
on the basis of the analyzed device characteristics, enabling or disabling communication between the device and the host machine via the bus.

3. A method of selectively, allowing a device access to a communications bus as claimed in claim 1, wherein the data relating to the device are stored on the host machine.

4. A method of selectively allowing devices access to a communications bus as claimed in claim 3, further comprising flagging the device as being disallowed if the device characteristics correspond to those stored in a table of parameters.

5. A method of selectively allowing devices access to a communications bus as claimed in claim 1, further including analyzing the device characteristics while configuring communication between the device and the host machine.

6. A method of selectively allowing devices access to a communications bus as claimed in claim 1, wherein the communication between the device and the host machine is handled by a device driver corresponding to the specific device.

7. A method of selectively allowing a device access to a communications bus as claimed in claim 1, further comprising transmitting from the host machine a signal which stops detection and/or configuration of a disallowed device.

8. A method of selectively allowing a device access to a communications bus as claimed in claim 1, further comprising directing data flow from the device to a driver corresponding to an allowed device whereupon at least one of configuration and communication is initiated on the bus.

9. A method of selectively allowing a device access to a communications bus as claimed in claim 1, wherein the communications bus complies with universal serial bus (USB) standard.

10. A method of selectively allowing a device access to a communications bus as claimed in claim 9, wherein on connection or configuration of the device connected to the bus, a filter software issues a GET_DESCRIPTOR function, the device connected to the bus responding to the GET_DESCRIPTOR function by returning one or more descriptors which relate to the characteristics of the device, the device connected to the bus identifying whether the device is allowed or disallowed by using the one or more descriptors.

11. A USB bus operating in accordance with the method of claim 9.

12. The method of claim 1 further including the step of analyzing the device characteristics by filtering software which queries the device for device descriptors, compares the returned device descriptors with those listed in a table of disallowed device descriptors and, if the device is allowed, initiating data transfer on a USB bus or alternatively, if the device is disallowed, preventing communication on a USB bus.

13. A method of selectively allowing a device access to a communications bus as claimed in claim 1, wherein the analyzed device characteristics include device type, manufacturer, and class of device.

14. A host machine incorporating a bus operating in accordance with the method of claim 1.

15. A computer-readable medium including a set of instructions stored on the computer-readable medium that when executed cause the computer to perform the comparison step and enabling or disabling step of claim 1.

16. A computer-readable medium as claimed in claim 15 wherein the instructions stored on the computer-readable medium that when executed cause the computer to analyze the device characteristics.

17. A method as claimed in claim 1, wherein the steps of the method are performed by a computer.

18. A method of selectively allowing a device connected to a communications bus to the communications bus, said bus being adapted to allow communication between one or more devices having analyzed device characteristics and a host machine, to method including the steps of:
(a) comparing the analyzed device characteristics with data relating to one or more specified devices;
(b) enabling or disabling communication between the device and the host machine via the bus on the basis of the analyzed device characteristics; and
(c) remapping data transfer from a disallowed device to a generic device driver adapted to prevent the disallowed device communicating on a USB bus.

19. A method of selectively allowing devices access to a communications bus as claimed in claim 18 wherein the remapping step is effected by assigning one or more new device descriptors to the device which cause the device to be linked to the generic device driver.

20. A computer-readable medium including a set of instructions stored on the computer-readable medium that when executed cause the computer to interact with a device configuration procedure when connecting said device to a bus, the program being arranged for causing the computer to (1) analyze characteristics of the device connected to the bus to determine if the device connected to the bus is allowed or disallowed with reference to a table of parameters corresponding to disallowed devices, and (2) configure the device connected to the bus for communication on the bus if the device connected to the bus is allowed, and (3) prevent communication if the device connected to the bus is disallowed, and (4) redirecting data flow from the device to a generic device driver which prevents the disallowed device from communicating on the bus in response to the device being disallowed.

* * * * *